United States Patent [19]
Ross et al.

[11] Patent Number: 5,519,669
[45] Date of Patent: May 21, 1996

[54] ACOUSTICALLY MONITORED SITE SURVEILLANCE AND SECURITY SYSTEM FOR ATM MACHINES AND OTHER FACILITIES

[75] Inventors: Paul C. Ross, Morris Plains; Alex Kononov, Bridgewater; William W. Plumlee, Andover; S. David Roth, Randolph, all of N.J.

[73] Assignee: AT&T Corp., Murray Hill, N.J.

[21] Appl. No.: 108,268

[22] Filed: Aug. 19, 1993

[51] Int. Cl.$^6$ .................................................. G01S 15/00
[52] U.S. Cl. ............................ 367/93; 340/541; 902/6
[58] Field of Search ........................... 340/541, 539, 340/523, 519, 825.31–825.35, 825.5; 348/143, 152–55; 367/93–94; 364/516–17, 460, 479; 902/6; 235/379–382.5; 187/105, 132, 140; 381/56

[56] References Cited

U.S. PATENT DOCUMENTS

| | | | |
|---|---|---|---|
| 4,044,860 | 8/1977 | Kaneko et al. | 187/132 |
| 4,112,419 | 9/1978 | Kinoshita et al. | 367/93 X |
| 4,839,631 | 6/1989 | Tsuji | 340/541 |
| 4,845,682 | 7/1989 | Boozer et al. | 367/93 |
| 4,942,464 | 7/1990 | Milatz | 902/6 X |
| 5,043,705 | 8/1991 | Rooz et al. | 367/93 X |
| 5,131,508 | 7/1992 | Suzuki | 187/132 |
| 5,331,312 | 7/1994 | Kudoh | 340/541 |

FOREIGN PATENT DOCUMENTS

| | | | |
|---|---|---|---|
| 1137615 | 12/1982 | Canada | 367/93 |

*Primary Examiner*—Thomas Mullen
*Attorney, Agent, or Firm*—Charles E. Graves; Martin I. Finston

[57] ABSTRACT

Acoustic surveillance of objects and human traffic in a spatial zone of a financial transaction device is used to detect movement within the zone. Several specific types of detected movement defined as abnormal trigger an alert to a remote monitoring station. The alerts are automatically prioritized using rule-based criteria. Enhanced surveillance of the alert site by audio links as well as site alert history information are provided.

12 Claims, 14 Drawing Sheets

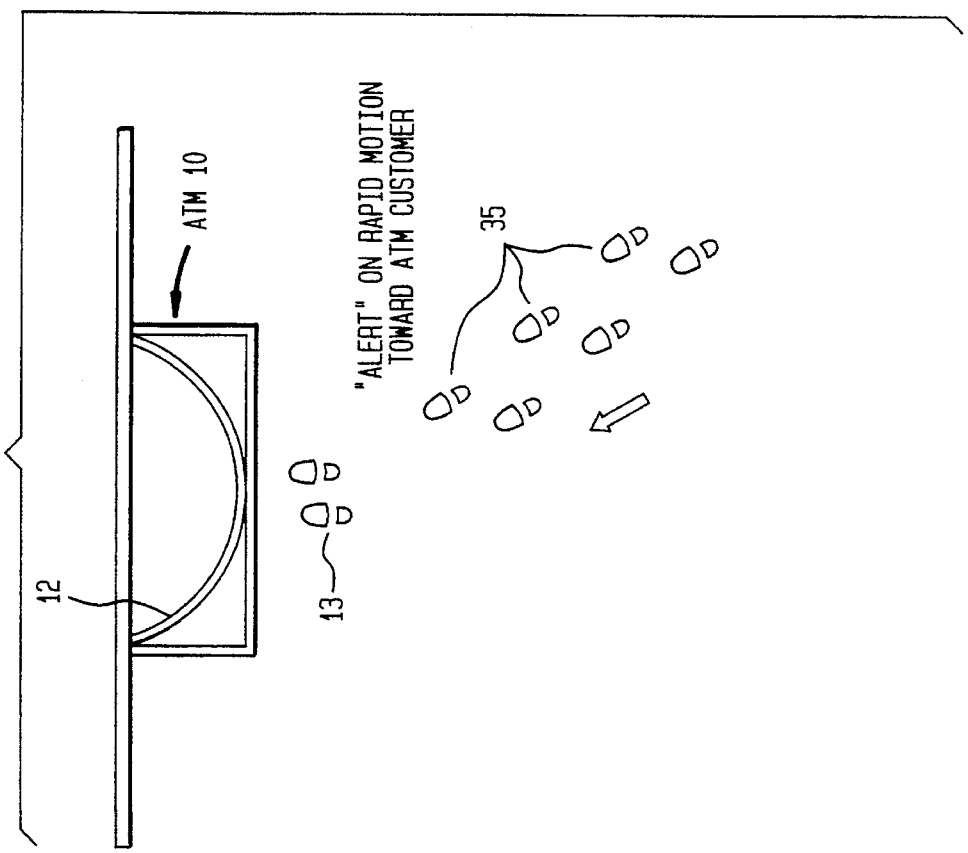
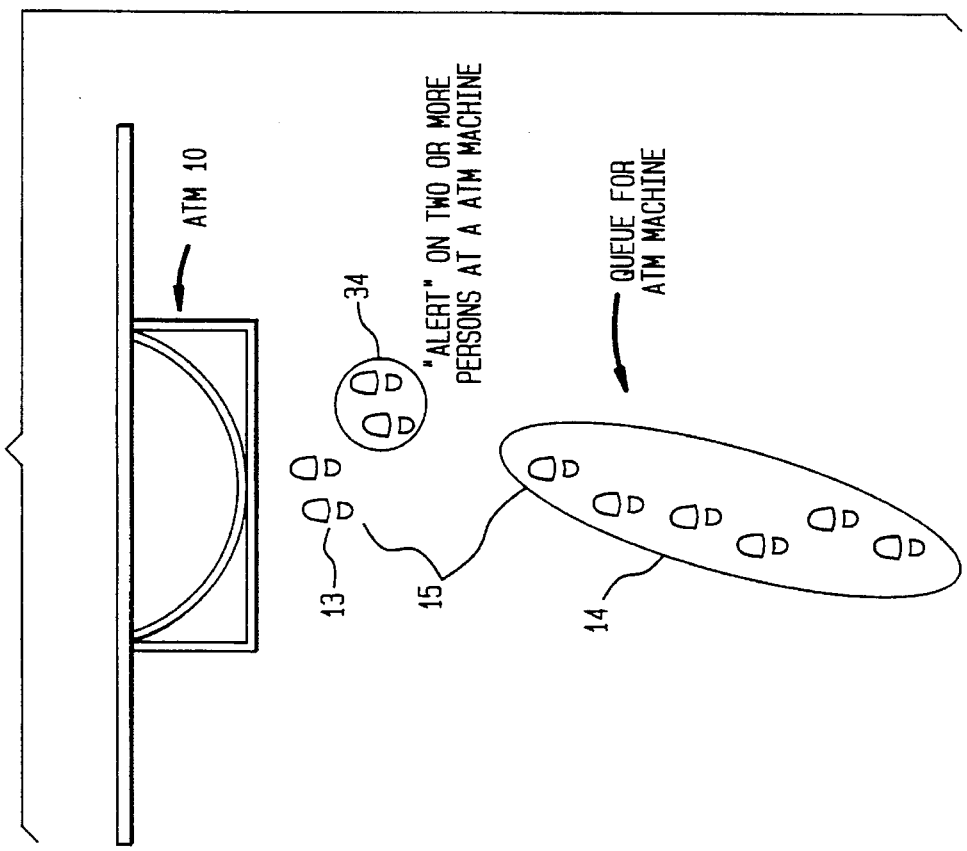

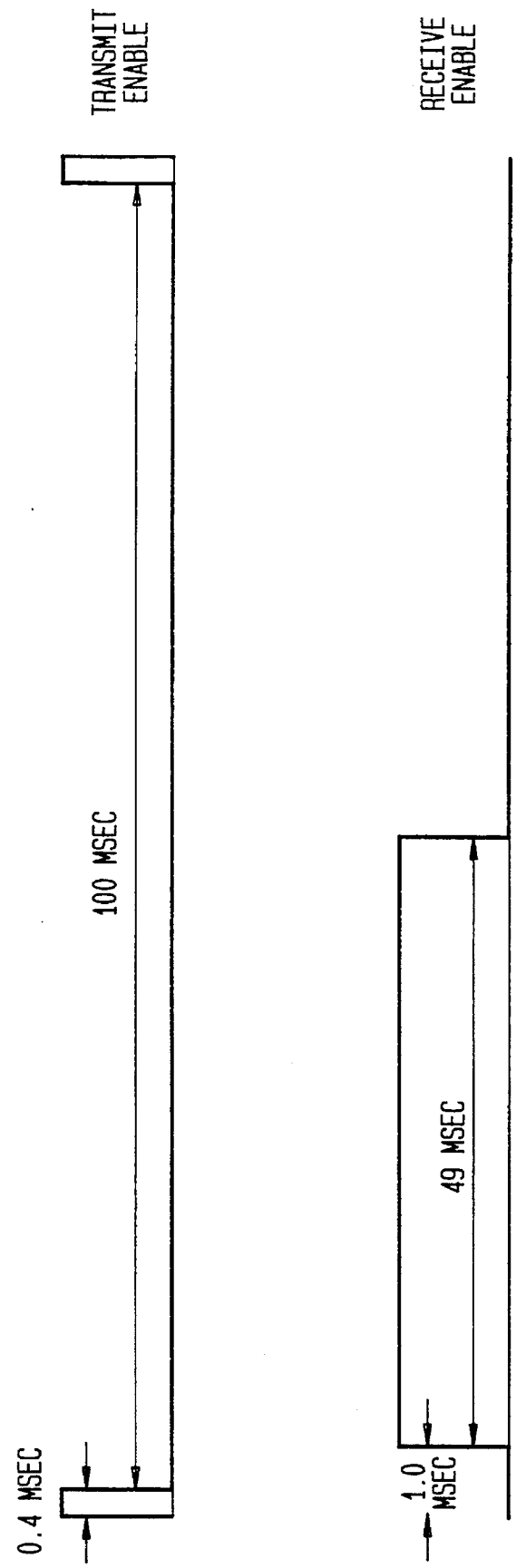

ns application of rightward-pointing tokens and mechanisms should be arranged to create such tokens. It is a good idea to make use of a single token.

5,519,669

ACOUSTICALLY MONITORED SITE SURVEILLANCE AND SECURITY SYSTEM FOR ATM MACHINES AND OTHER FACILITIES

FIELD OF THE INVENTION

This invention relates to automated remote site surveillance for ATM and other types of financial transaction devices; and also to machines, warehouses, shopping malls, parking lots, small businesses, residential properties and the like. In particular, the invention relates to the automated identification and reporting of activities at such a site which are or may be abnormal and hence indicative of possible endangering activity at the site.

BACKGROUND OF THE INVENTION

Currently, security surveillance of unguarded sites for burglary, vandalism or other unlawful activity, or for augmenting protection of guarded sites, usually involves taking video camera images of site activity and transmitting the images to a remote central monitoring point. Detection of an actionable incident or event at the site is left to a human observer, who periodically inspects an array of video displays of multiple sites. Because of fatigue and other factors, the chances of the observer failing to notice an incident are substantial. Further, automated reading of video imagery and signal patterns to provide discrimination among physical objects and their movement is difficult because of the complex and expensive signal processing required to accurately discriminate discrete object movement activity in a video pattern. Also, video bandwidth limitations of voice-grade circuits restrict the information that can be transmitted as video images.

SUMMARY OF THE INVENTION

It has been realized that acoustic surveillance methods and apparatus are uniquely well-adapted to detect suspicious object presence and movement within a limited and discrete area such as an ATM or other financial transaction facility. The acoustic signal patterns emanating from objects and their movement may be spatially processed and the results analyzed in accordance with predetermined rules to distinguish suspicious from routine activity.

The invention contemplates using an active acoustic system to generate a sound signal into a site such as an ATM location, for example. Various characteristics of the return waveform are measured. The measures include a comparison of the return waveform to a predetermined "template" of the site with no movement activity; and comparisons to the earlier return echoes. The measures then are evaluated according to the rules to determine whether a given return waveform is indicative of a suspicious event.

The possible occurrence of a suspicious event is determined by acoustically detecting movement activity which is inconsistent with behavioral norms for the site. These norms are deterministic: one such norm, by way of example, is the zone of privacy habitually afforded by the cue of customers awaiting their turn, in consideration for the privacy of the customer currently transacting business at the ATM. A sudden movement of a physical shape toward the user, or two or more persons present at the machine, are automatically detected by monitoring variations in the acoustic field pattern of the ATM area scanned.

When a defined deviation from the normal is detected, one or more responsive and protective strategies are invoked. An alarm is sent to an attended central monitoring station over connecting telecommunications linkages. Prioritized information on the type of movement is displayed on the attendant screen along with site information including site layout, access roads and alarm history. Once alerted, the attendant may activate a local video monitor to obtain one or more video or/and acoustic information frames for the moments immediately preceding the alarm time. Depending on the event, the system or attendant may shut down or restrict the money-dispensing capability of the ATM.

In accordance one aspect of the invention, return echo signals are received by an acoustic array of multiple pickup receivers mounted on or near to the ATM, and directionally oriented to monitor echoes returning from particular azimuth angles within the beam of the receivers.

The invention and its further aspects, features, and implementations will be more readily appreciated from a reading of the description to follow of an illustrative embodiment.

DESCRIPTION OF THE DRAWING

FIGS. 7 and 8 are top views of the acoustically monitored space in front of the ATM, illustrating alert situations;

FIG. 15 shows an operating cycle for the system.

DETAILED DESCRIPTION OF AN ILLUSTRATIVE EMBODIMENT

Figure 1:
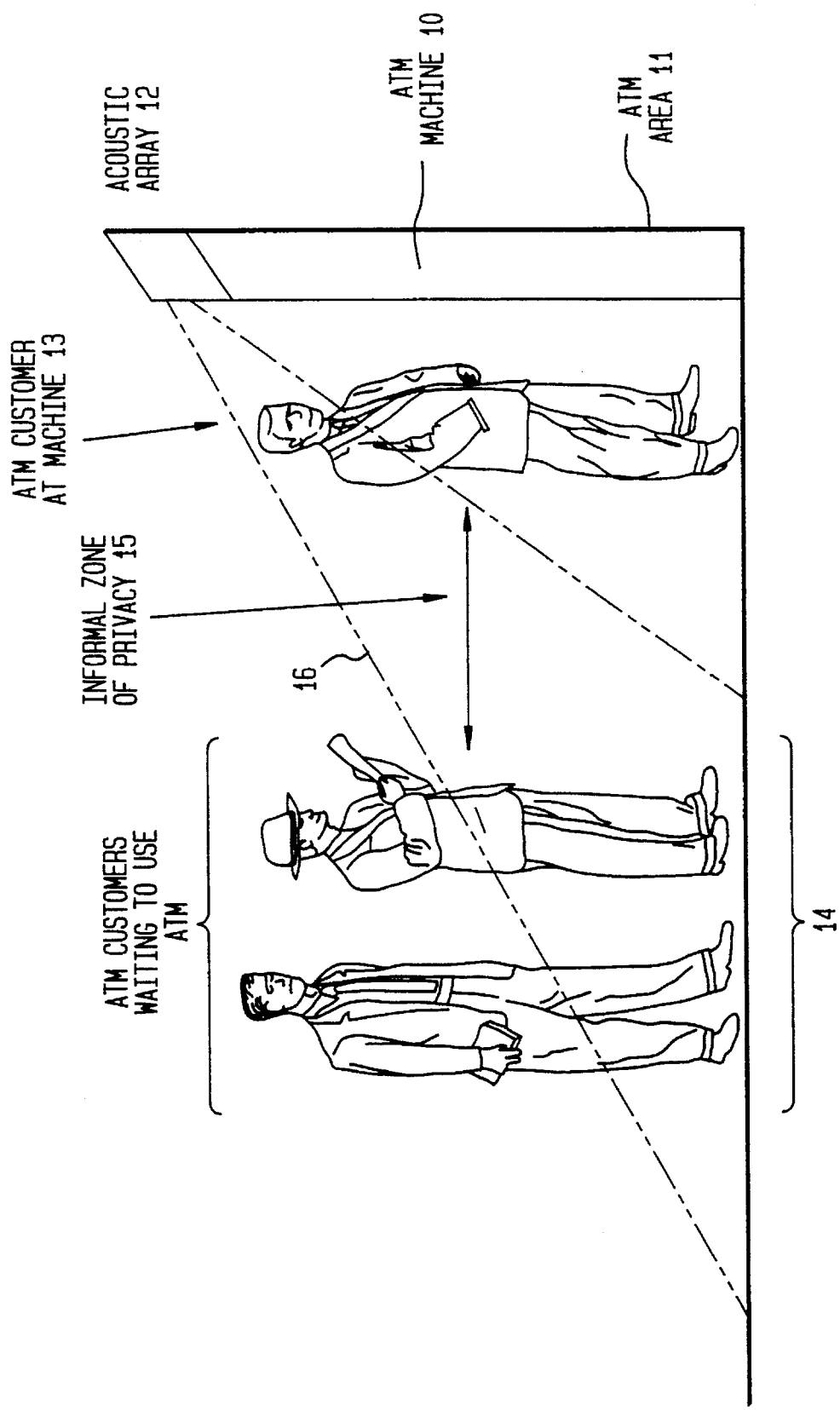
FIG. 1 is a schematic drawing of an active ATM site with user cue.

As seen in FIG. 1, an ATM machine 10 installed in an ATM area or enclosure 11 (spatial zone) is augmented with an active sonar 12 which actively acoustically monitors the area in front of ATM 10 in a manner to be described. Machine 10 is in use by a customer 13; and a line 14 of waiting customers is formed. Persons familiar with ATM usage recognize the "courtesy" space afforded to the current machine user 13 by the cued customers, providing the current user 13 a zone of privacy denoted 15 in which the user 13 can conduct transactions in relative privacy.

Figure 2:
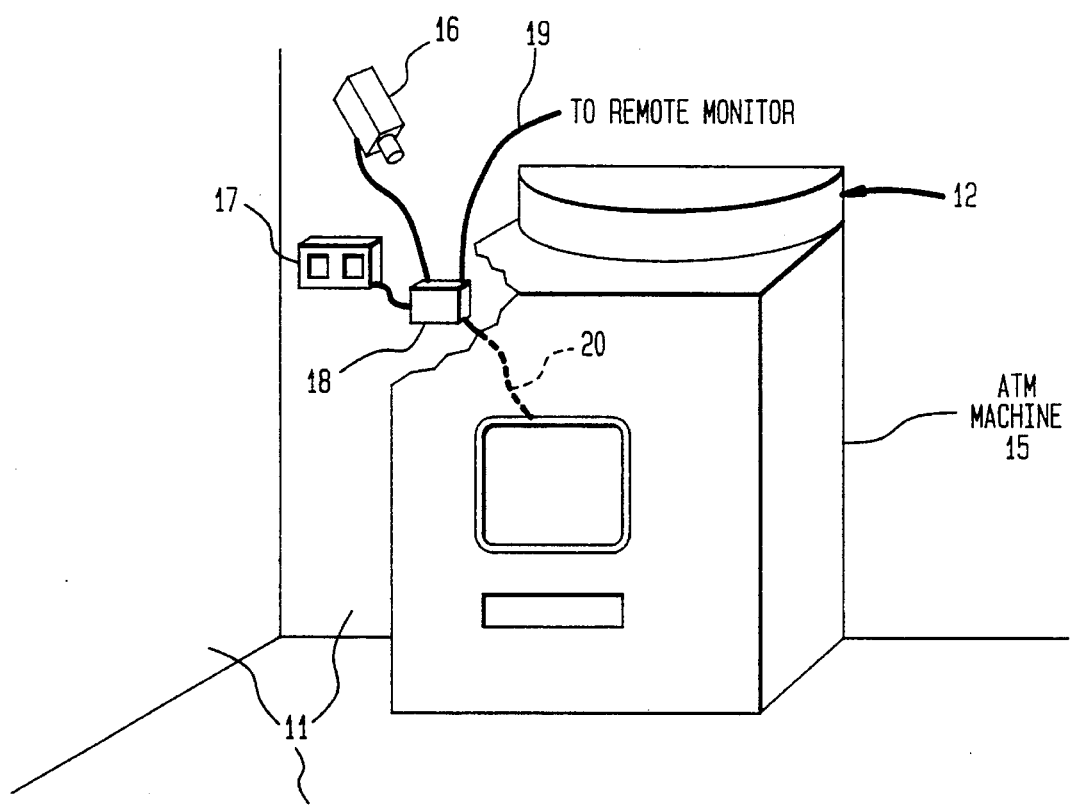
FIG. 2 is an isometric diagram of an ATM machine augmented with an active acoustic array.

FIG. 2 shows an active sonar 12 mounted on top of machine 10 to acoustically survey the spatial zone 11 in front of and around the machine. The active sonar 12 may be mounted elsewhere in the ATM spatial zone instead of on the machine 10 itself. FIG. 2 also shows a video camera 16 and an audio transceiver 17 mounted in spatial zone 11. A local controller 18 mounted internal to machine 10 provides communications control between camera 16 and transceiver 17 to a remote monitoring site through a network connection 19. Certain functionalities of the ATM itself may, in accordance with the invention, also be linked to controller 18 through connection 20, and controlled remotely in a manner to be described.

Figure 3:
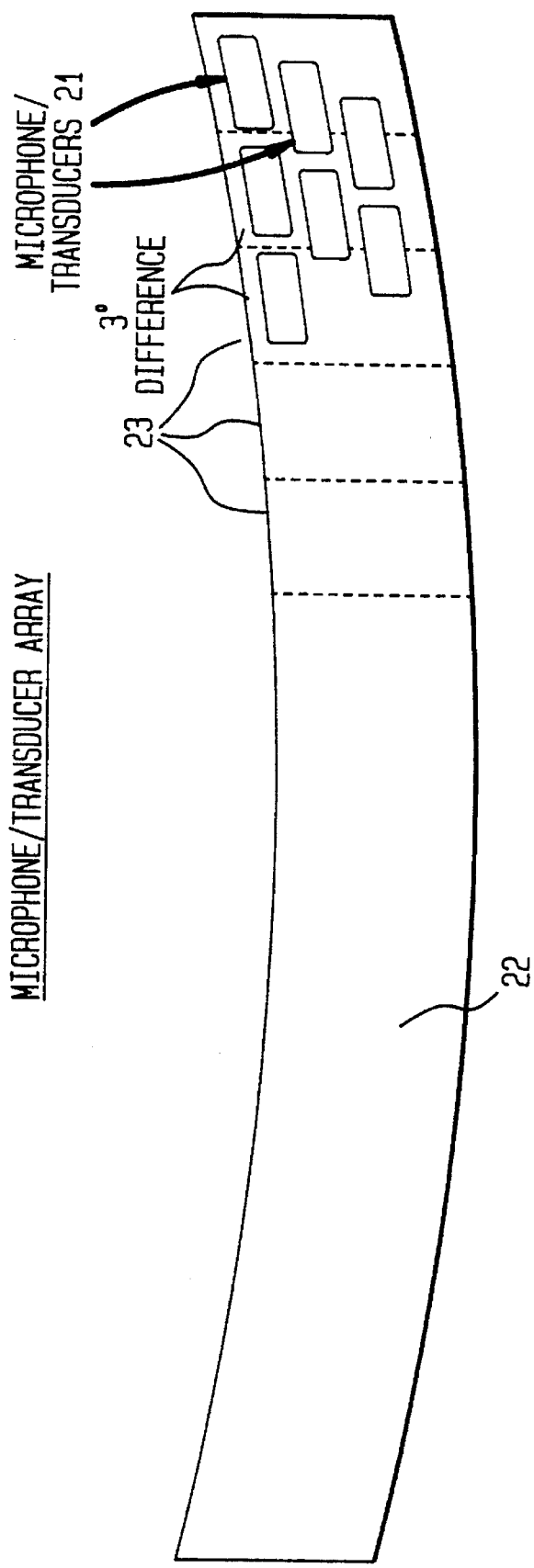
FIG. 3 is a detailed schematic diagram of directional mounted microphone arrays for detecting return acoustic echoes of an active acoustic pulse.
Figure 5:
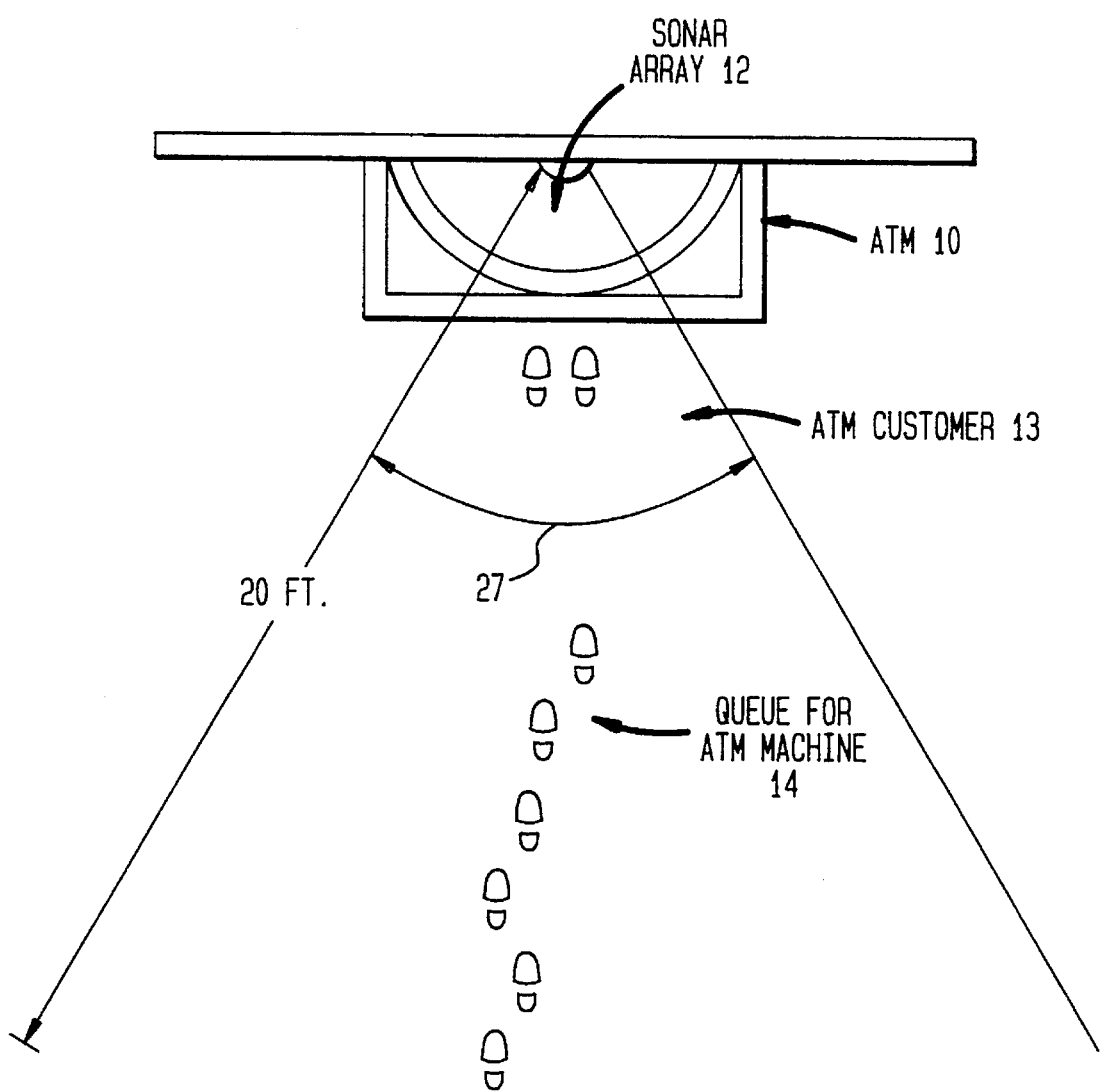
FIG. 5 is a top view diagram of the acoustically monitored field in front of the microphone array, showing an exemplary customer cue.

FIG. 3 shows a specific version of active sonar 12 as consisting of an array of directional microphone/transducers 21 each generating bursts of sound or "pings," and each functioning as a microphone to receive return echos from the pings. Microphone mount 22 is shaped to orient individual transducers to cover the space of the spatial zone 11 at 3 degree horizontal azimuth angle intervals, subtending about 120 (or more as necessary) horizontal degrees and 20 vertical degrees as measured from the horizontal. The 3 degree directional intervals may be achieved by providing a succession of flat surfaces 23 on mount 22 which differ in their horizontal orientation by 3 degrees. As seen in FIG. 5, the horizontal orientation of active sonar 12 enables physical objects in front of machine 10 including machine-using customer 13 and the cued-up customers 14 to be acoustically detected by the microphones of the transducers 21 that make up the horizontal angle denoted 27.

Figure 4:
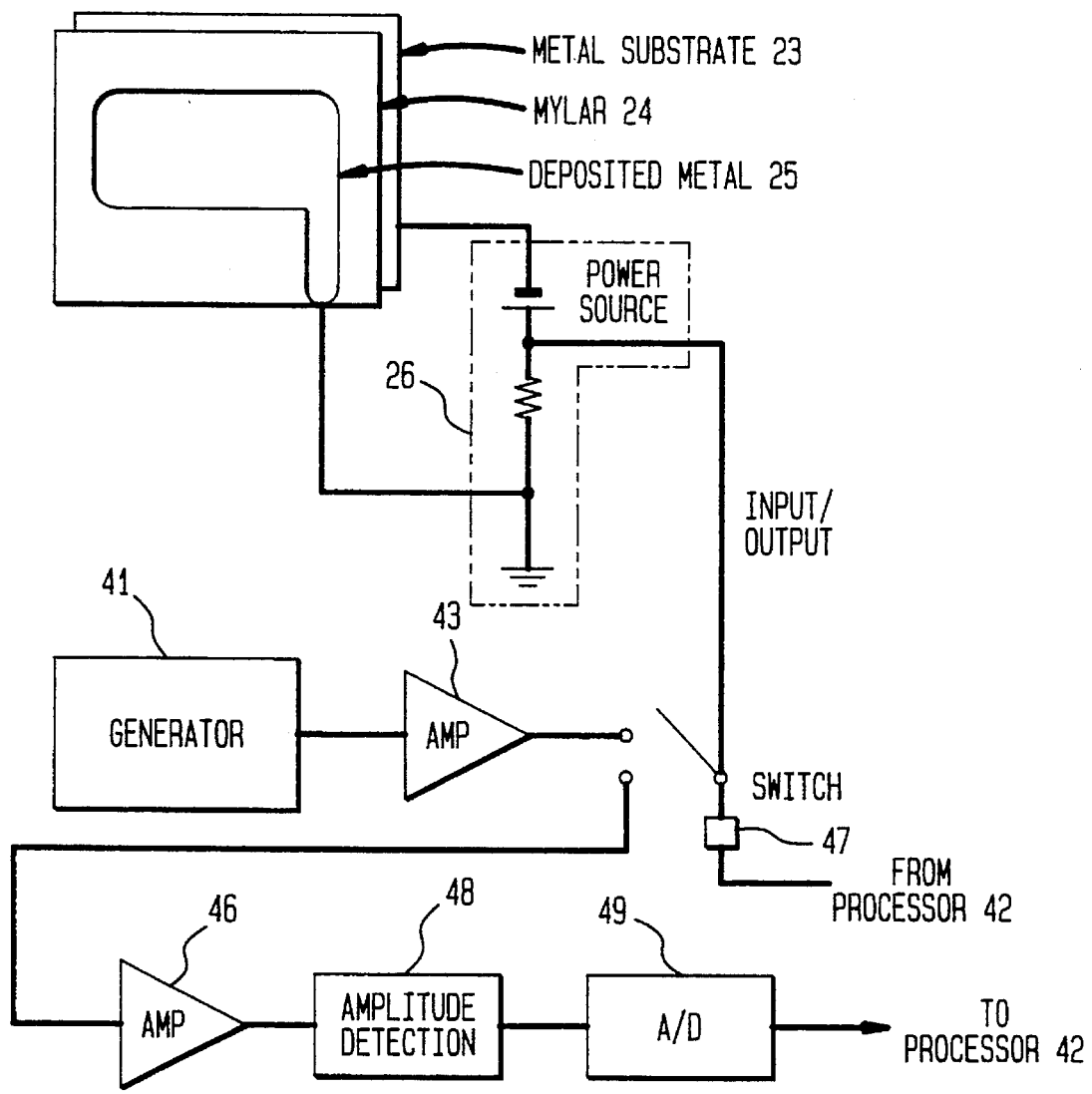
FIG. 4 is a schematic circuit diagram of an electrostatic microphone/transducer used in the array.

The transducer 21 may be of the electrostatic type shown in FIG. 4, consisting of a metal substrate 23, a Mylar layer 24, a deposited metal coat 25, and a power supply circuit 26.

Figure 6:
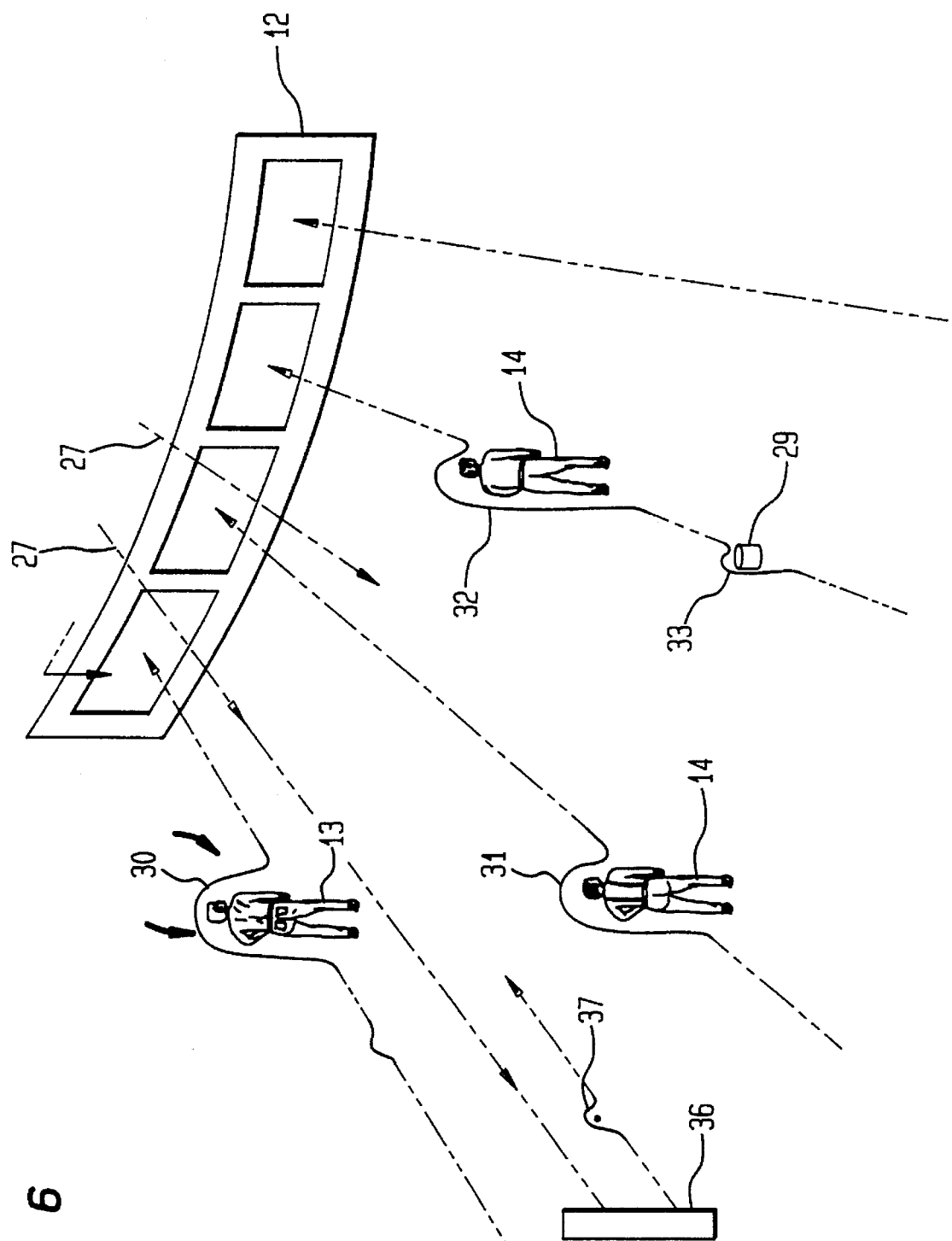
FIG. 6 is a more detailed isometric drawing illustrating the field of coverage of the array.

The continuous acoustic surveillance of area 11 illustrated in FIG. 6. The active sonar 12 sends out "pings" denoted 27, which encounter objects denoted 13, 14, 29 from which echos 30, 31, 32, 33 are returned. The echos returning from various known directions are pattern information that enables signal processing equipment, to be described below, to detect a wide variety of physical activity. For example, the event depicted in FIG. 7, where 2 or more persons are positioned in front of machine 12, is one type of acoustically detectable event which is defined as actionable activity. Here, the entity 34 may be a person who has intruded on the zone of privacy 15 of customer 13. The event illustrated in FIG. 8 consists of rapid movement of an entity as denoted the footstep path 35 from the far acoustic field to or toward the ATM-using customer 13. The very onset of any rapid movement within the purview of array 12 exemplified by the preceding can be detected as signal amplitudes representing return echos; and is an event that triggers an alarm.

Further in accordance with the invention, a "negative" acoustic return echo may also signify the occurrence of an actionable event. To illustrate, referring to FIGS. 6 and 9, ATM machine area 10 includes a window 36 or other closure. One of the microphone/transducers 21 is permanently pointed at the window 36; and a normal echo 37 signal is returned by the window as an electrical signal received in time. If window 36 is disturbed by opening or breaking, the electrical signal 37 is substantially reduced in amplitude, which registers as a relatively negative signal in the same time slot.

Figure 9:
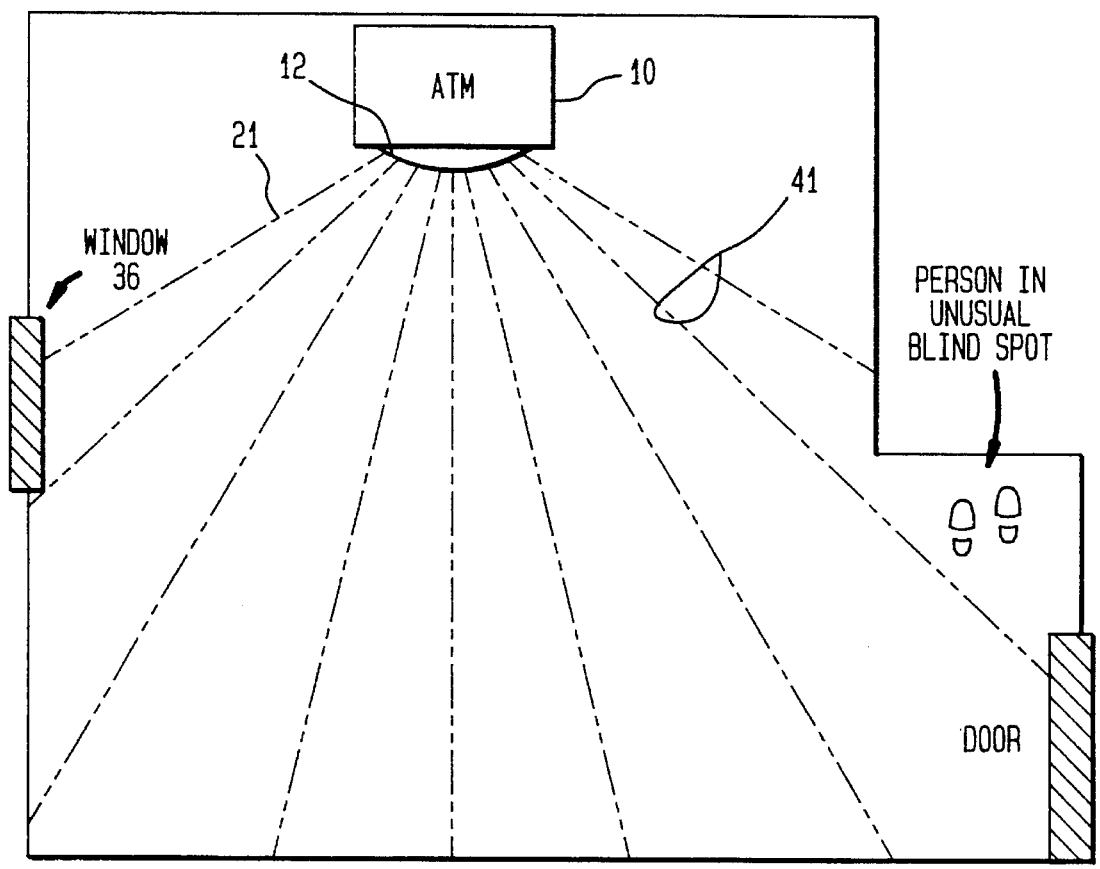
FIG. 9 is a top view sketch of an ATM site illustrating the invention's ability to discriminate events based on negative acoustic indicia.

Similarly, referring still to FIG. 9, a person 38 may enter the machine area 11 through an access door 39 and locate in a place such as 40 that is not directly accessible by the pinging signals 41 or by video camera 16. The original entry of person 38 through door 39 registers as a positive echo signal; but the subsequent disappearance of person 38 as a now negative echo signal is also detected. Taking the two events together, it may be concluded that the person has occupied the blind space 40. Over a long enough time this condition is taken as indication of a lurking intruder; and an alert is automatically triggered. Detection of a lurking intruder in a blind spot may also be registered from monitoring the reflected energy from the relevant search beam and nearby beams, to look for change in the reverberant field of that sector.

The acoustic signal generation, detection and data processing which permits the critical discrimination between normal vs. suspicious events will now be further described.

Figure 10:
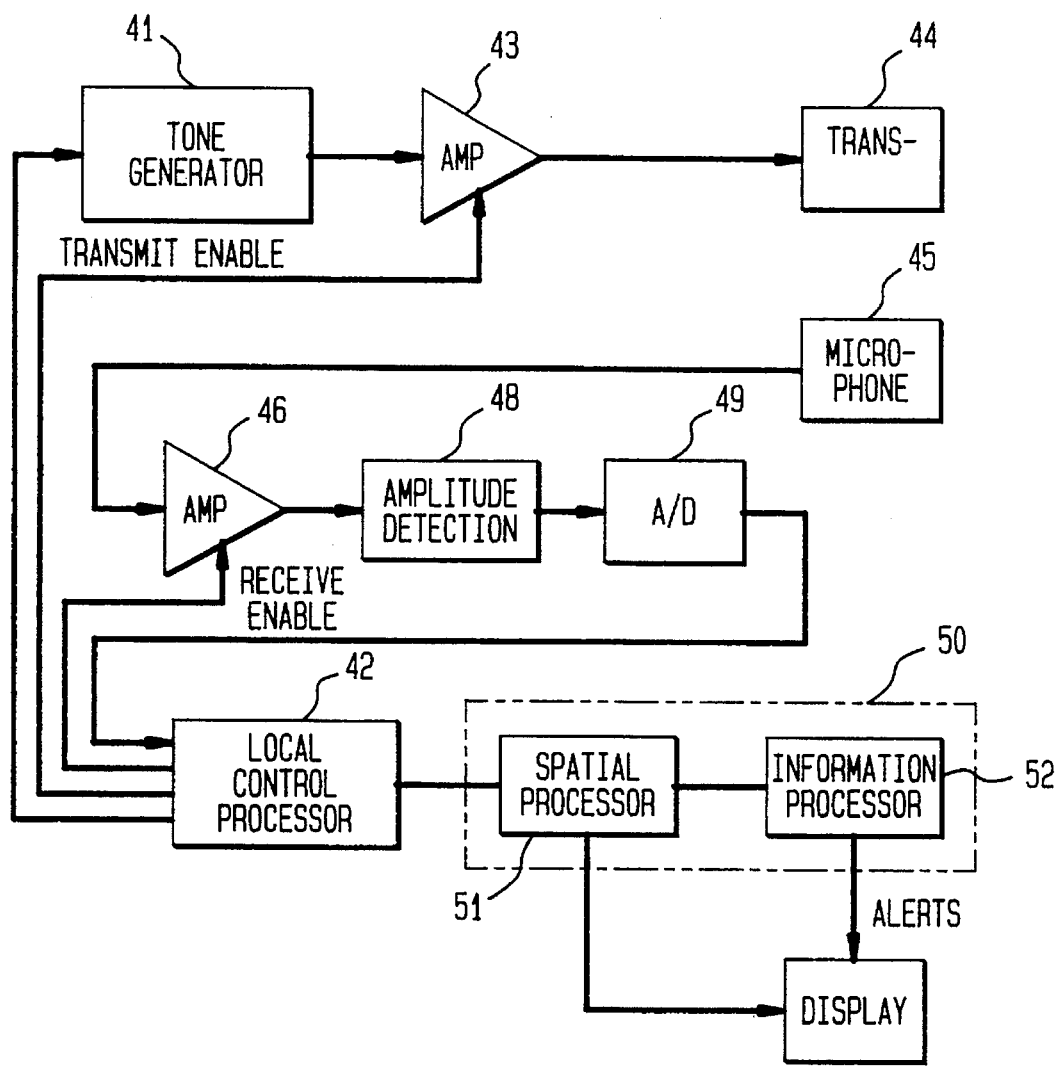
FIG. 10 is a functional block diagram of the electro-acoustic circuit.

Referring now to FIGS. 4 and 10, an illustrative hardware configuration is shown for detecting, analyzing, discriminating, displaying and reacting to suspicious movements or disappearances in the area of the ATM. The pulse and detection timing sequence is set to survey objects within about 25 feet of the active sonar 12. An operating cycle for the system, shown in FIG. 15, consists of transmission of an acoustic energy pulse for a period of 0.4 msec., a wait period of about 0.6 msec to allow the transmit diaphragm to damp, a receive period of about 49 msec. during which the echo signal energy is detected and analyzed, and finally a silent period during which the system is shut off. Electronic tone generator 41 is triggered by local control/processor 42 to produce a 50 KHz electrical signal. This signal is amplified in amplifier 43 to 10–50 milliwatts and applied to transmitter 44 for a 0.4 msec. period. The resulting acoustic pulse is propagated into essentially all of the 3-dimensional space in front the ATM enclosure.

In the receive phase, the echo signals from all objects within the focus of the array are received, essentially as separate packets or envelopes of acoustic energy at the microphones such as microphone 45. Each packet is received at a time that varies directly within the distance to the object from the array. The energy of each packet varies inversely as the square of said distance, but directly in accordance with the relative size of the object. An alternative drive circuit for the active sonar is shown in FIG. 4 where a 1-component transmit/receive transducer is switched between transmit mode and receive mode by switch 47.

The echo signal characteristics are convened to electrical signals, the amplitudes of which are used to build a spacial map, or frame, containing all objects in front of the ATM. A sequence of these frames are analyzed to identify alerts. Specifically, the received echo signals are amplified in amplifier 46 and fed to a detector 48 which recognizes discrete amplitude bursts above a set threshold. This threshold may, for example, comprise a quiescent state "template" of the fixed or invariant echo characteristics of the enclosure. The template may be generated by analyzing the echoes created in response to one or a succession of pings launched at a time when human activity at the site is not occurring, such as when the facility is closed down. The quiescent condition template information is then subtracted from all frames to concentrate frame-to-frame analysis upon signal energy which is caused by objects occupying or moving within the ATM area.

If objects such as humans are in the purview of the active sonar 12, the objects will be manifested as energy envelopes or bursts which remain after the template detail is subtracted out. These bursts are then digitalized in A/D converter 49.

Advantageously, converter 49 has a capacity to handle about 40 channels with a sampling rate of at least 6.4 KHz with 12–16 bit data. Output from A/D converter 49 is sent to local control/processor 42.

One device suitable for performing the functions of processor 42 is an Ariel MP-3210 Dual DSP 3210 ISA card. Spatial processing and information processing functions may be provided by DSP32C or equivalent. Processor 42 also generates transducer transmit and microphone control signals. Processor 42 formats the data into a sequence of samples, which form each successive frame or spacial map. These samples are stored in a local memory in processor 42.

Figure 12:
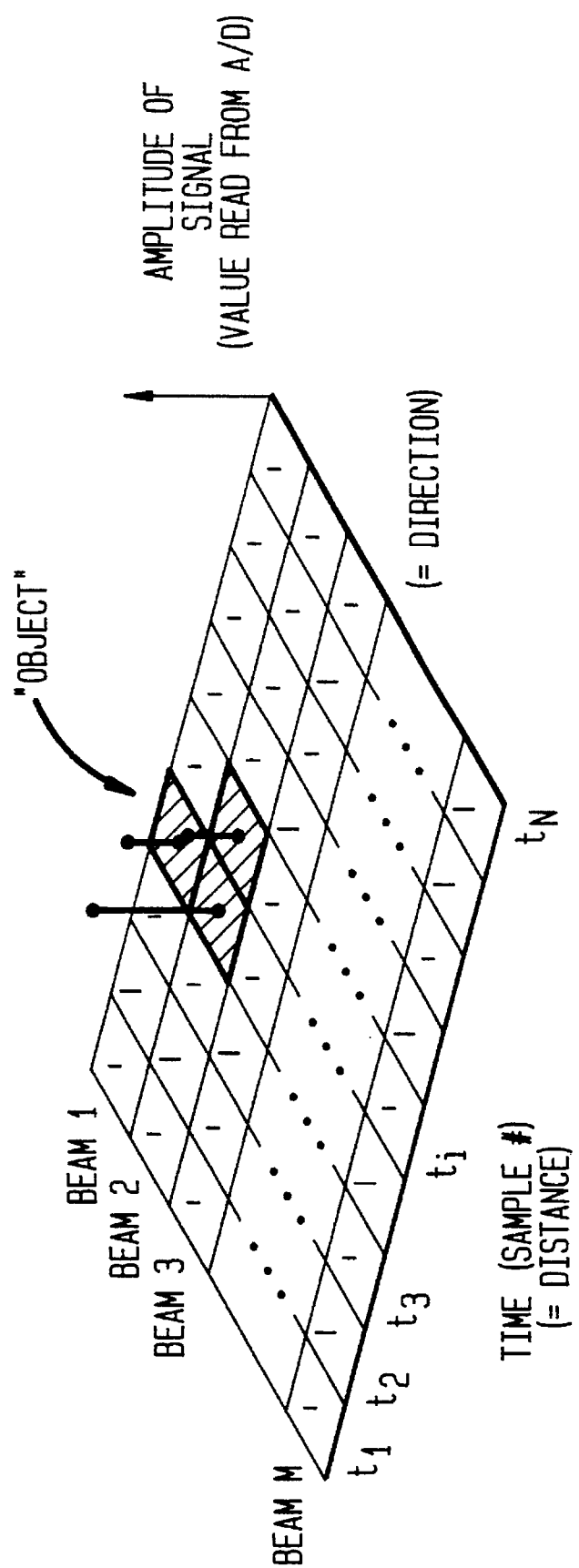
FIG. 12 is a schematic diagram illustrating detection of physical objects in the view of the array.

Data critical to identifying suspicious events now is abstracted from the stored samples by, for example, a separate computation unit 50 which contains spatial processor 51 and information processor 52. Spatial processor 51 forms for each frame a 2-dimensional image of objects in the beam area covered by each directional microphone. The image data includes relative direction, distance of the image from the transmit/receive apparatus on the ATM, and amplitude the latter being a measure of the image size. As illustrated in FIG. 12 which shows sample objects at distance $t_i$ on beams number 1 and 2, object location with respect to each microphone 45 is a function of beam number and delay. Size and other attributes of the object are represented in the amplitude magnitude. Comparison of successive frames of data provide indicia of the velocity of a moving object. These data are fed to information processor 52 which converts the data of the image samples to indicia of location of moving objects, their relative movement with respect to each other, and other measures.

Figure 11:
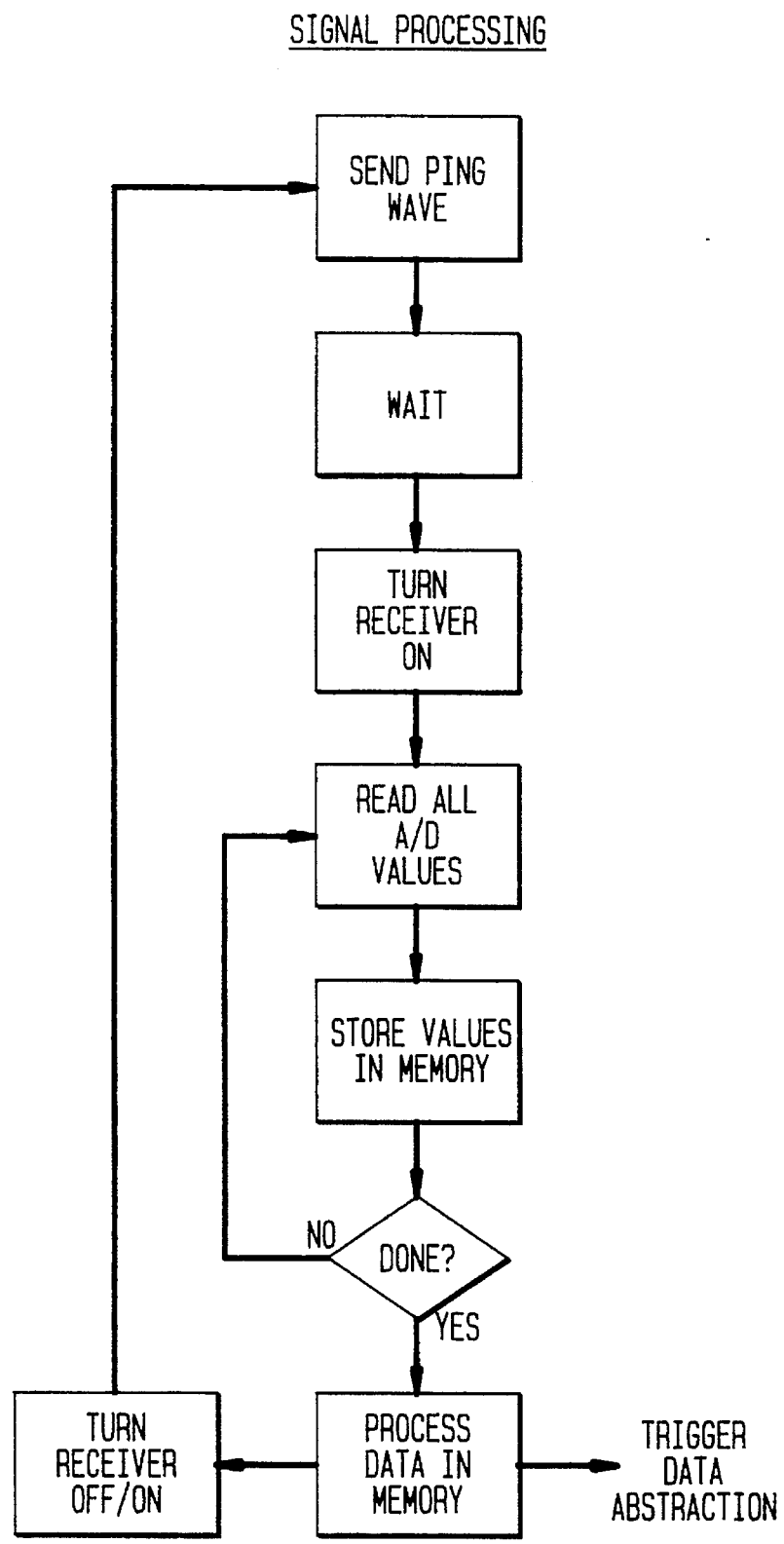
FIG. 11 is a flow chart of the signal processing of the FIG. 10 apparatus.
Figure 13:
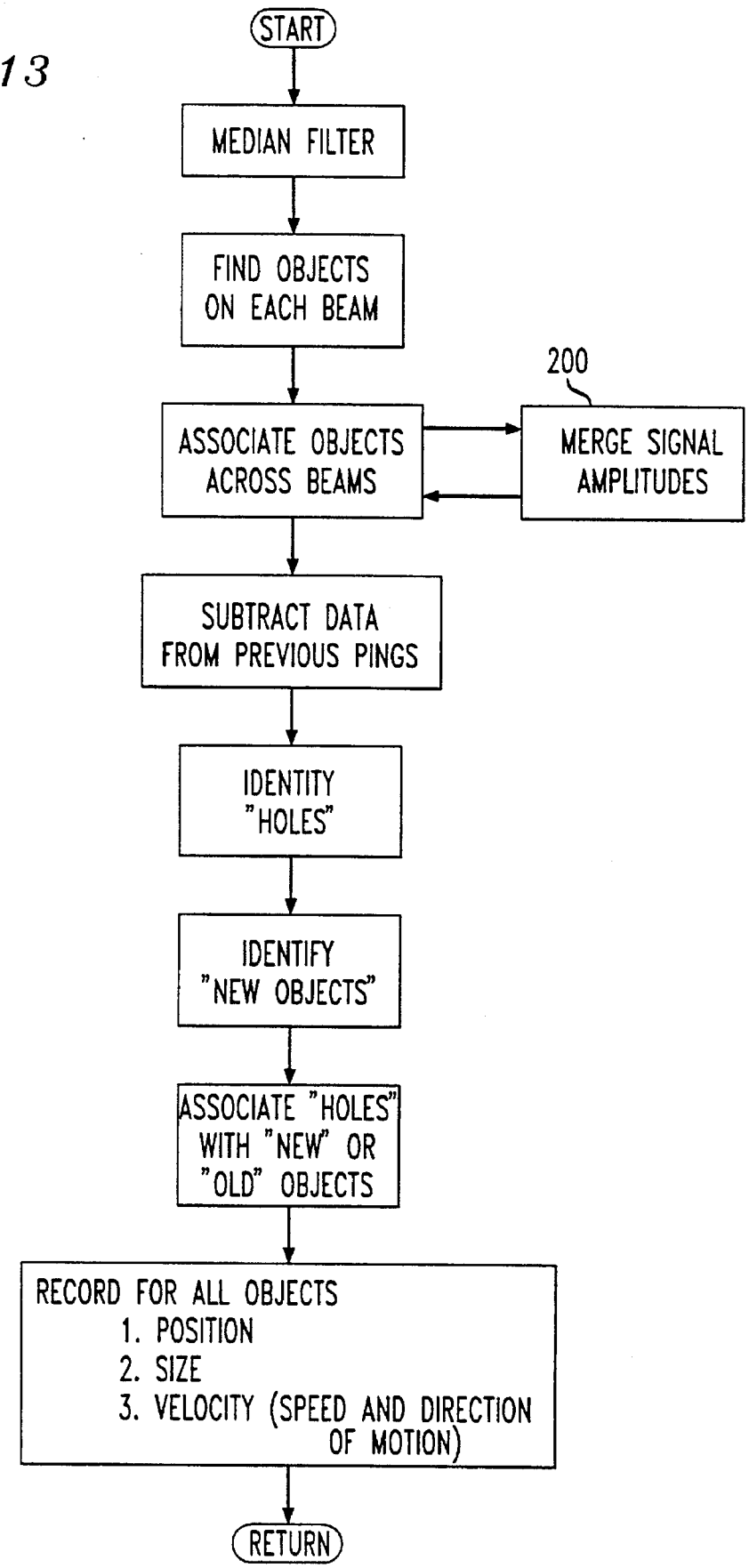
FIG. 13 is a further flow chart describing signal processing for data abstraction to achieve discrimination.

The steps for the above-described signal processing are further outlined in the process flow chart of FIG. 11. An envelop of return echo signal energy is received by each of the microphones 45. Each envelop is measured individually and a digital reading for each is created and stored. Data is collected long enough to assure that the "ping" wave travels to the most remote reach of the spatial zone 11; and any echo has travelled back to the microphones 45. The number of samples taken advantageously corresponds to a time interval of about 50 msec between reads, in order to generate and analyze data in near-real time for fast alerting of abnormal events. When this time is reached, a "completed" decision is effected, which triggers the data abstraction analysis in accordance with the process flow chart of FIG. 13.

The nature of the acoustic data collected and the relative ease of its analysis is a strength of the invention, because of the precise directionality afforded by the active sonar 12, and the fact that return signal amplitudes and the times of receipt provide highly reliable data on which to base useful events analysis. The raw data is filtered to remove noise and reverberation characteristics (the "template" referred to earlier) of the enclosure. New objects, new "holes" and object/"hole" movement are identified.

Referring back to FIG. 12, the separate digitized signal amplitudes exceeding the threshold are equalized. The spatial processing may be enhanced by merging the equalized signals in adjacent beams which are at or about the same distance from the array, as indicated in block 220 of FIG. 13. This merging operation will typically take place in spatial processor 51, shown in FIG. 10. For example, 1 and 2 are shown to have detected object clustered in adjacent cells of the array. These object pulses are merged into a single pulse because they are likely to emanate from a single discrete object. The distance to each identified object is determined by the beam whose merged signal (maximum amplitude) is deemed most reliable. The merging step helps discriminate objects in the present instant by correlating them to the same objects of previous scans. The size of the object defined by merged signals may be estimated more closely by determining the number of beams the object is detected on.

To determine movement in time, an updated spatial representation of the scene is formed. Each collected frame of data is subtracted from the preceding frame of data. A "hole" is signified by the absence of a return pulse in the present frame where in the previous frame or frames one was present at a given matrix point. Objects that appear on the scene are detected as positive peaks; and objects that disappear are detected by noting negative energy peaks or "holes." The updated spatial data identifies any newly-arrived or newly-moving objects as signified by the presence of an echo at the given matrix point where previously an echo did not exist.

The tracing of movement is a matter of logically tracking the path of "holes" and "peaks" movement over the scanned matrix. If a "hole" has moved to a contiguous cell in unison with the movement of an adjacent positive peak, it is interpreted as a movement of the object from a "hole" to a peak.

Using the information on moving objects identified by the data abstraction process, several searches and comparisons are then performed to determine if an alarm situation should be signalled. A normal transaction is the case of a single object tracked in an approach to the ATM machine, which remains close to the ATM for a limited time period to allow transaction completion. This event is declared or labelled a routine "customer" activity. However, movements connoting alarm situations include: (1) two or more objects which simultaneously approach the ATM machine; (2) a single identified object which approaches the ATM machine but does not use it by the end of some predetermined period of time; (3) a previously labelled customer that is still in front of the ATM machine after the predetermined allowed period; and (4) any object that approaches a previously identified routine user no matter what the user's location may be.

Additionally, a sudden disappearance of a return pulse in a beam that is directed, for example, to a window, a counter, or a door of the enclosure, is by definition an alarm. A further alarm condition is the disappearance of a previously identified moving object signalled by the appearance of a "hole." This condition might signify presence of a person lurking out of the acoustic beam's reach under unexplained circumstances.

A further alarm condition may be the lack of movement over some long time interval of a previously moving object, which could signify, for example, a person who had crouched under an ATM service counter if present in the enclosure. Many other alarm conditions beyond these examples will occur to persons skilled in the art, which the spatial analysis of the invention can detect.

Figure 14:
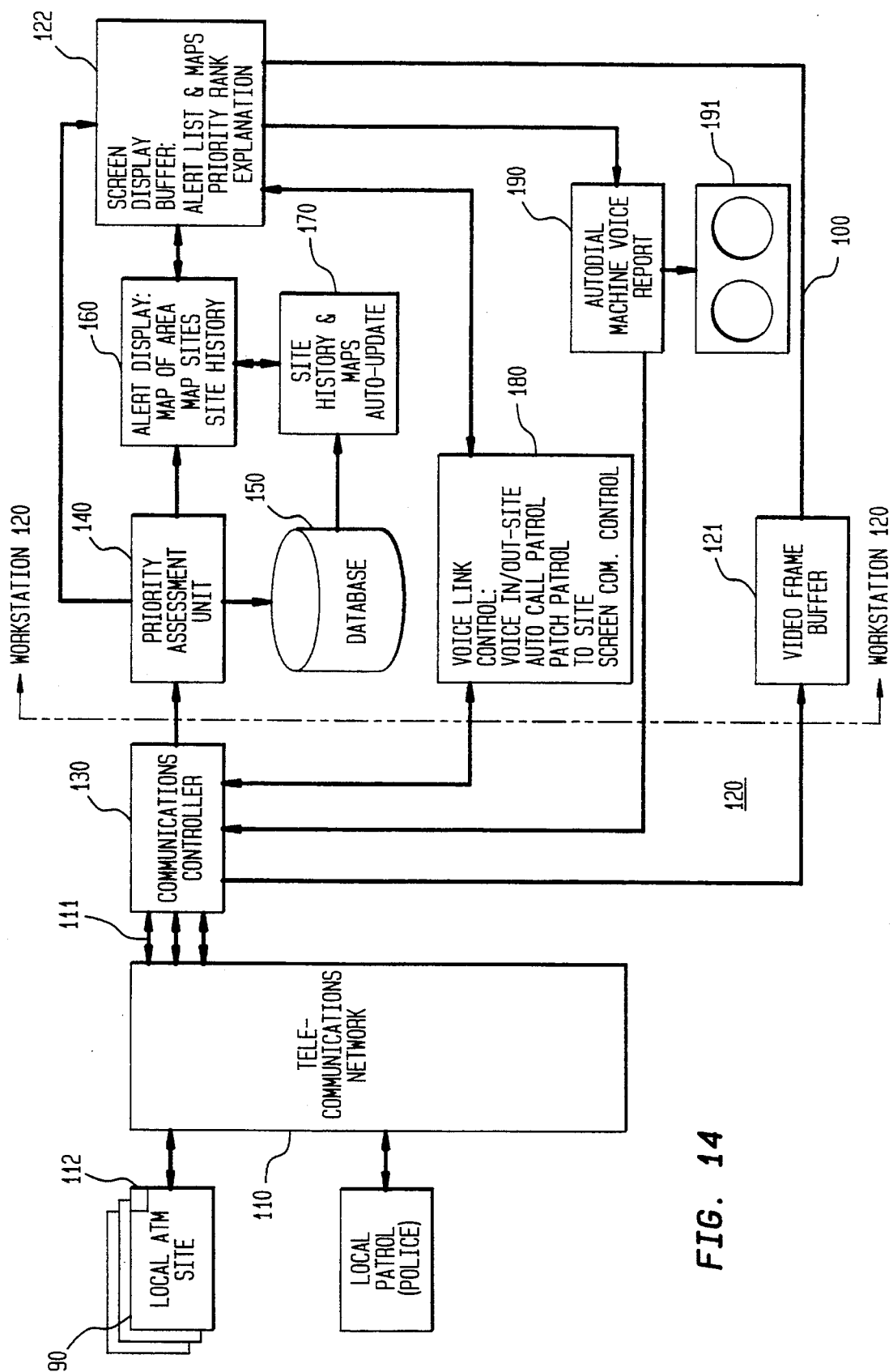
FIG. 14 is a high level functional block diagram of a full system for practicing the invention, including details of the attendant workstation data flow and display architecture.

The invention as so far illustrated may be usefully integrated into a remote monitoring system for one or several financial transaction devices. While a variety of specific arrangements may be envisioned, an exemplary such system with its particular attributes is described in FIG. 14.

One or more ATM machines 10 each served by an active sonar 12 are located at ATM site 90. The data processing and abstraction capability described hertofore may be located at the ATM site, or may be provided at some location remote from the site 90. Alarm conditions are automatically signalled by local controller 18 to a remote monitoring location 100 through network connections 19 to a telecommunications network 110 which comprises lines of at least voice-grade quality.

Condition signals are received at a workstation denoted 120 at the monitoring location. The workstation 120 has an alert screen display 160 served by buffer 122. A communications controller 130 interfaces the workstation to the network 110 through two-way communications lines 111. Controller 130 may include adjuncts (not shown) such as a modem pool and line concentrator to manage incoming and outgoing traffic.

Incoming message priority assessment unit 140 establishes priorities among alarm situations. Its processes are rule-based, addressing factors such as: what type of event as detected by the analyzed data precipitated the alert message; what is the priority of the alert; and given the presently-active alerts, what is the relative urgency of the new alert. These considerations are programmed as rules into the unit 140.

The rules may work as illustrated in the following example. Suppose that several alerts are currently in effect and the attendant at remote location 100 is managing one of these alerts, which is a "rapid approach to ATM user." Now, a new alert is received by the attendant workstation, for which the data abstraction unit has determined that two objects are approaching some other ATM machine. On response to this new input, the alert display 160 presents information signifying "two people at ATM" for this further site. In this case, although the new information is displayed, the workstation priority-setting program does not direct the attendant to interrupt the on-going review and handle the new alert.

If, however, the attendant was reviewing a "two person approach" in progress, and the new alert constituted a "rapid approach" situation, the priority assessment unit 140 interrupts the present review by, for example, opening a window on display 122 accompanied by a tone signal. The window showing the new alert explanation and, if available, a still frame video of the new alert scene.

An on-line database 150 collects information from the output of unit 140, and also has access to site data and history information from site history store 170. The history file includes prior alert instances, and location map information. In response to a specific site alert, the display buffer 122 provides a visual image of the streets and access roads for the ATM site in store 170; and also a plan view of the specific ATM site layout with walls, counters, polls, doors, etc. As new alert information is received for a given site, data on the date and type of event is entered into a permanent file for the site also contained in store 141. This accumulated data bank enables ATM site managers to recognize particular security problems, patterns of ATM robberies and other facts; and react accordingly.

Site history will vary; and for sites which experience relatively more alerts and particularly for those experiencing more actual criminal activity, the system may be set to effect a periodic "page" of such sites. The "page" shows on display 160, for example, in the form of a prompt to the attendant to view a paged video still shot, for example, once very 10 minutes.

When the system registers no alerts at any ATM sites, which is likely to be a great majority of the time, the system provides automatic polling of selected sites. The attendant thus can routinely examine the acoustically-generated object movement data, the video-generated current site still shot, and the available audible activity, as added surveillance capability.

The system also advantageously may contain a two-way continuously open voice link 180 to each ATM location from the remote monitoring station, enabling the attendant to engage in two-way conversation with persons at a site, or to listen-only as needed. The site includes an audio microphone and receiver unit 19 for this function with voicegrade circuits 111 linking unit 19 and the site and remote monitoring station 100. Voicelink 180 may include a screen switch control for operator use (not shown).

At the ATM sites a video camera denoted 16 in FIG. 2, provides periodic video images. Using video compression and other well-known techniques for transmitting video signals over narrowband telephone lines, a video image may be transmitted to monitoring site 100 at least every 3 seconds. When video is provided in conjunction with the present invention, controller 130 feeds the video information to video frame buffer 121 for referral to display 160 through display buffer 122. In addition to the remote monitoring and response to detected alarm conditions, the system may also generate a visual or audio alert locally, which advantageously may be located so as to be unnoticed by the ATM users, but which enables locally cognizant persons such as a bank security guard to investigate and, if indicated, intervene.

If on reviewing and evaluating alert information, the attendant determines police help is needed, an autodialer 190 provides automated voice calling to security patrols or to the local police. Autodialer 190 identifies the alerting site, and provides a brief, concise recorded statement describing the alarm condition. An audio statement of the site history file may be included in the automated message. Dialer 190 also records all voice transactions to tape unit 191, supplying time, date and site stamps for the record.

A voice link may also be opened between the site and the security patrol or the police. These further communications capabilities may assist in deterring or thwarting an attempted robbery, and further enable the public to be more comfortable in their use of ATM facilities.

We claim:

1. For a defined spatial zone having fixed structures and a particular pattern of normal human movement, apparatus for distinguishing between normal movement activity and atypical movement activity, said apparatus comprising:

a) means for transmitting periodic bursts of acoustic energy from a transducer into said zone to generate return acoustic echos from said fixed structures and from any human forms present;

b) an array of directional microphones for receiving said return echos, said microphones being respectively oriented at successive, incremental, horizontal angles, thereby to create a plurality of adjacent beams of return echo coverage of the spatial zone;

c) means for generating and storing in a dataframe a spatial map of objects comprising said fixed structures and human forms causing said return echos following each said burst, said map containing for each said object data on its distance and relative direction from said transmitting means;

d) means for comparing successive said dataframes to determine changes in the spatial location of said objects;

e) means for determining whether any of said location changes belong to a predetermined set, referred to as the Special Set, of particular location changes;

f) means for generating an alarm signal in response to a positive determination that a given location change belongs to the Special Set;

g) means for generating a spatial reference map based only on return echo signals from the fixed structures, and means for composing each said dataframe with said fixed structure return echo signals removed; and h) means for merging return-echo signal amplitudes which are present in adjacent beams of return-echo coverage and have originated at substantially the same horizontal distance from said transmitting means.

2. For a defined spatial zone having fixed structures and a particular pattern of normal human movement, apparatus for distinguishing between normal movement activity and at least two categories of atypical movement activity, said apparatus comprising:

a) means for transmitting periodic bursts of acoustic energy from a transducer into said zone to generate return acoustic echos from said fixed structures and from any human forms present;

b) an array of directional microphones for receiving said return echos, said microphones being respectively oriented at successive, incremental, horizontal angles, thereby to create a plurality of adjacent beams of return echo coverage of the spatial zone;

c) means for generating and storing in a dataframe a spatial map of objects comprising said fixed structures and human forms causing said return echos following each said burst, said map containing for each said object data on its distance and relative direction from said transmitting means;

d) means for comparing successive said dataframes to determine changes in the spatial location of said objects;

e) means for determining whether any of said location changes belong to a predetermined set, referred to as the Special Set, of particular location changes;

f) means for generating an alarm signal in response to a positive determination that a given location change belongs to the Special Set;

g) means for generating a spatial reference map based only on return echo signals from the fixed structures, and means for composing each said dataframe with said fixed structure return echo signals removed; and h) a video camera directed on the spatial zone, and a workstation connected to the camera via a communications link, the workstation having a display screen and comprising means for selectively obtaining videoframe images from the camera and displaying them on the screen;

i) first storage means for storing said videoframe images, and means for displaying said videoframe images on the screen in response to an alarm signal;

j) second storage means for storing reference information pertaining to occurrences of said alarm signals, and means, responsive to a given alarm signal, for displaying on the screen reference information pertaining to at least one occurrence of an alarm signal prior to the given alarm signal; and k) means for displaying on the screen a listing of two or more current alarm signals, each identified by location and the category of a corresponding atypical movement activity, and means, responsive to a predetermined urgency ranking of all said categories, for dedicating the workstation and the screen to the most urgent of the current alarm signals.

3. Apparatus in accordance with claims 1 or 2, wherein said spatial zone contains a financial transaction device.

4. Apparatus in accordance with claim 3, wherein the case of two or more objects simultaneously approaching the transaction device is a member of the Special Set.

5. Apparatus in accordance with claim 4, wherein the case of a single object approaching the transaction device and remaining within a predetermined vicinity of the transaction device beyond a predetermined time is a member of the Special Set.

6. Apparatus in accordance with claim 5, wherein the case of a first object approaching the transaction device, followed by a second object approaching the first object, is a member of the Special Set.

7. Apparatus in accordance with claim 6, wherein the case of any diminishment or disappearance of return-echo signal amplitude representing elements of said fixed structures is a member of the Special Set.

8. Apparatus in accordance with claim 7, wherein the case of an object that disappears which previously was identified as moving within the spatial zone is a member of the Special Set.

9. Apparatus in accordance with claim 3, wherein said transmitting means creates an acoustic energy pulse lasting for a period not exceeding substantially 0.4 msec; wherein thereafter said transmitting means and said directional microphone array are both turned off for a period sufficient to allow said transmitting means to completely cease transmitting; and wherein thereafter said directional microphone array is turned on until all direct echo return signals are received and thereafter is turned off.

10. Apparatus in accordance with claim 3, further comprising means controlled either at said transaction device or from said workstation, for disabling the transaction device from dispensing money.

11. Apparatus in accordance with claim 1 or 2, wherein the objects of the spatial map and the spatial reference map are represented as electrical signal amplitudes.

12. Apparatus in accordance with claim 11, further comprising:

means for setting a threshold level for the electrical signal amplitudes, such that an object will not be mapped if its corresponding electrical signal amplitude fails below the threshold level; and means for equalizing all electrical signal amplitudes that exceed the threshold level.

* * * * *